United States Patent [19]

Schlapp

[11] Patent Number: 4,802,707

[45] Date of Patent: Feb. 7, 1989

[54] SLIDING ROOF FOR AUTOMOBILES

[75] Inventor: Albert Schlapp, Dreieich, Fed. Rep. of Germany

[73] Assignee: Rockwell-Golde GmbH, Fed. Rep. of Germany

[21] Appl. No.: 167,274

[22] Filed: Mar. 11, 1988

[30] Foreign Application Priority Data

Mar. 11, 1987 [DE] Fed. Rep. of Germany ....... 3707697

[51] Int. Cl.$^4$ .......................... B60J 7/053; B60J 7/195
[52] U.S. Cl. .................................. 296/214; 296/222; 296/211
[58] Field of Search ........ 296/211, 214, 216, 220–223; 49/62, 63, 67, 92

[56] References Cited

U.S. PATENT DOCUMENTS

| 3,960,404 | 6/1976 | Bienert | 296/221 X |
| 4,390,203 | 6/1983 | Lutz et al. | 296/214 X |
| 4,587,880 | 5/1986 | Sprafke | 296/216 X |
| 4,616,456 | 10/1986 | Parker | 296/216 X |
| 4,707,022 | 11/1987 | Roos et al. | 296/214 |

FOREIGN PATENT DOCUMENTS

| 105294 | 3/1957 | Denmark | 49/67 |
| 24229 | 3/1956 | Fed. Rep. of Germany | 296/216 |
| 3442652 | 6/1986 | Fed. Rep. of Germany | 296/222 |
| 551956 | 4/1923 | France | 296/216 |
| 1382824 | 11/1964 | France | 296/214 |

Primary Examiner—Dennis H. Pedder

[57] ABSTRACT

In a sliding roof for automobiles, comprising a sliding lid guided on guide rails in a roof opening, a lid liner, which participates in the lid displacements, is connected with the sliding lid by guide elements, which, during lowering movements of the sliding lid, simultaneously raise the lid liner and, during raising of the sliding lid into its closed position, simultaneously lower the lid liner until it lies flush with the fixed liner without any step. To prevent a gap from remaining in the closed position between the peripheral edges of the lid liner and fixed liner opening, which would make possible penetration of noise into the vehicle interior, it is provided that the peripheral edge of the lid liner possess a downwardly facing bearing surface, opposite which there is a correspondingly upwardly facing counter-surface at the peripheral edge of the fixed liner opening, in such a manner that the bearing surface and the counter-surface bear against each other without a gap in the closed position. As soon as a slight upward movement occurs, the bearing surface lifts off the counter-surface to form a ventilating gap.

2 Claims, 3 Drawing Sheets

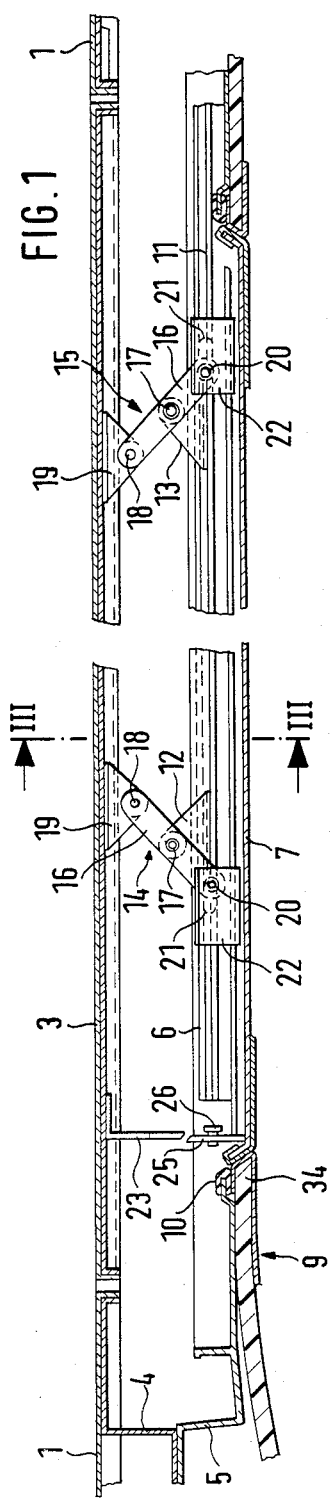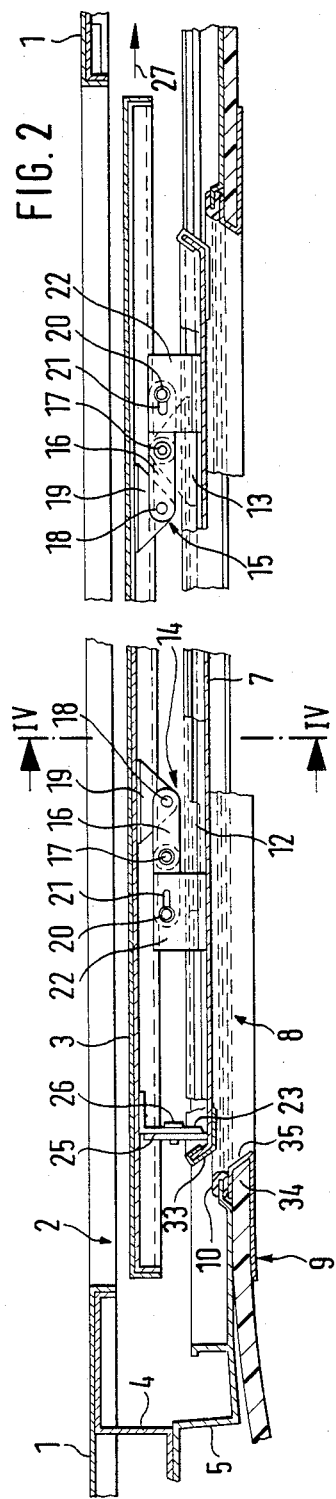

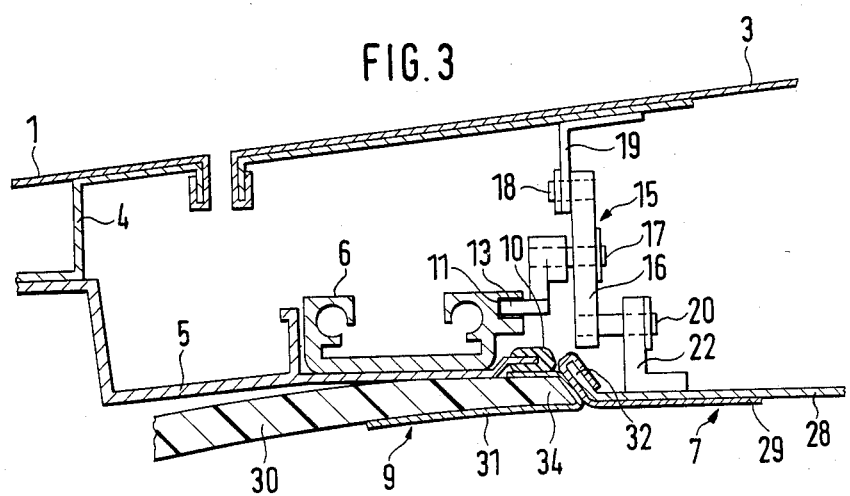
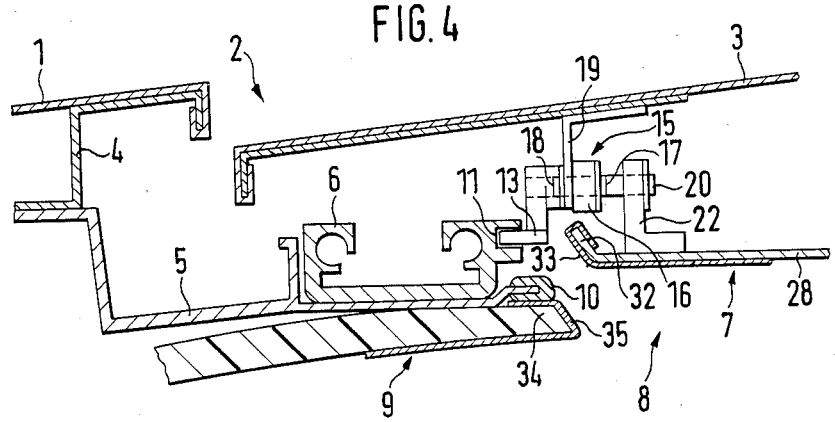

SLIDING ROOF FOR AUTOMOBILES

FIELD OF THE INVENTION

This invention relates to a sliding roof for an automobile and constitutes an improvement to the sliding roof shown and described in U.S. Ser. No. 902,982 filed Sept. 2, 1986, now U.S. Pat. No. 4,707,022, dated Nov. 17, 1987, directed.

In that patent application, the forming of a step between a fixed liner and lid liner in the region of an opening for the fixed liner and also grinding contact of the lid liner upon a connecting profile that surrounds the opening in the fixed liner are both avoided. For this purpose, the lid liner is mounted so as to be vertically movable on the sliding lid and is displaced simultaneously with the sliding lid during lowering and raising movements, but in each case in a direction opposite to the vertical movement of the lid. In the closed position of the sliding roof, the surface of the lid liner lies flush with the surrounding surface of the fixed liner, with the result that a virtually closed, smooth liner surface is achieved. The position in height of the lid liner when the sliding lid is lowered is so arranged that the lid liner is situated without contact above the connecting profile and therefore cannot grind or rub on this profile during sliding movements.

This sliding roof construction has since proved satisfactory, but it does appear capable of improvement, as will be explained below.

The lid liner possesses, peripherally, a vertically, upwardly orientated edge flange, by which the lid liner, when the sliding roof is closed, is situated inside the fixed liner opening with the formation of a peripheral edge gap. This peripheral edge gap ensures that the lid liner does not come into contact with the connecting profile that surrounds the opening in the fixed liner at any point during raising and lowering. This peripheral edge gap can, however, in spite of its only slender width, allow travelling noises to enter the interior of the vehicle in an undesired manner. Furthermore, the lid liner with its peripheral, upwardly flanged edge, must be raised beyond the depth measurement of the connecting profile when it is desired to achieve a ventilating position, that is to say the stroke movement of the lid liner necessary for this purpose is a function of the thickness or depth of the connecting profile.

OBJECT OF THE INVENTION

An object of the present invention is therefore to provide a sliding roof construction of the type described, in which the penetration of travelling noises through the roof construction is suppressed and with which ventilating positions of the lid liner are made possible even by a slight raising of this liner.

SUMMARY OF THE INVENTION

According to the present invention, there is provided a sliding roof for an automobile, the roof comprising a rigid sliding lid, slidably guided on lateral guide rails, for fitting in a roof opening so the lid is slidable beneath a rear, fixed automobile roof surface after having performed a lowering movement starting from its closed position, the lid having a movable lid liner which is connected to it and is slidably guided on said guide rails by guide elements, said guide elements of said movable lid liner being connected with the sliding lid or a component connected therewith in such a manner that a height spacing between the sliding lid and the movable lid liner is largest in the closed position of the lid and smallest after said lowering movement, and said movable lid liner, in its closed position, closing an opening in and being flush with a surrounding fixed roof liner; wherein the lid liner possesses, at its peripheral edge, a downwardly facing bearing surface, opposite to which there is a corresponding, upwardly facing counter-surface at a peripheral edge of the fixed liner opening, and wherein the bearing surface and the counter-surface bear against each other without a gap in the closed position.

In this both simple and effective manner, the presence of a gap between the periphery of the lid liner and the periphery of the opening in the fixed liner, which could permit entry of vehicle noise in the closed position, is avoided. Furthermore, only a slight upward displacement of the lid liner is necessary if a ventilating gap is to be set, because the bearing surface on the lid liner lifts off the counter-surface of the opening in the fixed liner as soon as the lifting movement commences.

Preferably, the arrangement is such that the bearing surface is an outwardly, upwardly inclined oblique surface, whereas the counter-surface complementary to it is an inwardly, downwardly inclined oblique surface. By this special construction, the lid liner can be pressed downwards into the opening in the fixed liner, the bearing surface and counter-surface bearing firmly against each other, but nevertheless they do not rub against each other in the upward displacement of the lid liner. In the closed position, with this preferred form of embodiment, no peripheral gap between lid liner and fixed liner is visible from the vehicle interior, but virtually only an outline which marks the periphery of the lid liner.

In an alternative form, the bearing surface is constructed as a stepped surface, which rests from above against the counter-surface in the closed position. Here again, bearing surface and counter-surface can be so pressed against each other in the closed position that an effective screen against noise is produced. Here again also, after a slight lifting movement of the lid liner, a peripheral ventilating gap is obtained.

The mutually associated peripheral edges of the fixed liner opening and of the lid liner do not need to be constructed throughout as counter-surface and bearing surface respectively, but the arrangement can indeed be such that the bearing surface and the counter-surface each constitute only partly the associated peripheral edge, and that further surfaces, adjacent to the bearing surface and counter-surface respectively, of the peripheral edges of lid liner and fixed liner opening respectively, are opposite to each other in the closed position with the formation of a gap between. In spite of this gap, nevertheless, as a result of the peripheral bearing surface which is pressed against the peripheral counter-surface, a screen against noise is obtained. The gap-forming surfaces are either oblique surfaces inclined in pairs or they are orientated in pairs approximately vertically.

The invention also extends to an automobile incorporating the present sliding roof.

BRIEF DESCRIPTION OF THE DRAWINGS

For a better understanding of the invention, and to show how the same may be carried into effect, reference will now be made, by way of example, to the accompanying drawings, in which:

FIG. 1 is a longitudinal section through part of an automobile roof with the sliding lid closed, FIG. 2 is a view similar to FIG. 1 but with the sliding lid lowered and lid liner correspondingly raised, FIG. 3 is an enlarged sectional view taken along the line III—III in FIG. 1, FIG. 4 is an enlarged sectional view taken along the line IV—IV in FIG. 2, and FIGS. 5 to 10 are schematic sectional views of various forms that peripheral edges of the opening in the fixed liner and the lid liner can take, wherein in each case the upper view shows the peripheral edges lifted off each other and the lower view shows the peripheral edges bearing against each other.

DESCRIPTION OF THE PREFERRED EMBODIMENT

Figure 5:
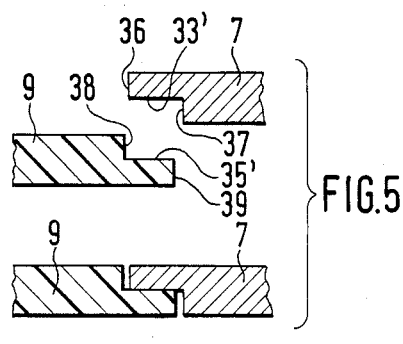

In FIGS. 1 to 4, the following components of the sliding roof construction can be seen, namely, a fixed roof surface 1 of a passenger vehicle, a roof opening 2 provided therein, a sliding lid 3 associated with the latter, a reinforcing frame 4 framing the roof opening 2 at the front and sides, a sliding roof frame 5 fixed thereto, guide rails 6 situated on each of the two lateral frame components of the sliding roof frame 5 (of which only one can be seen in the drawings), a lid liner 7, a fixed liner opening 8 associated with it (FIGS. 2 and 4), a fixed liner 9, a connecting profile 10 pushed onto the four inner peripheral edges of the sliding roof frame 5, a guide channel 11 of the guide rail 6, open towards the fixed liner opening 8, front and rear guide shoes 12, 13 respectively slidably engaging into the guide channel 11, front and rear guide elements 14, 15 respectively comprising these guide shoes, two-armed levers 16, constituting their basic functional components, the bearing journals 17 which pivotally journal the levers 16 on the front and rear guide shoes 12, 13 respectively, bearing pins 18 for articulating the two-armed levers to the sliding lid 3, associated bearing blocks 19 fixed to the sliding lid 3, guide pins 20 on the other arm of the two-armed levers 16, guide slits 21 which receive the guide pins 20, and support members 22, firmly connected to the lid liner 7 and possessing the guide slits 21.

In addition to the four guide elements, consisting of two front guide elements 14 and two rear guide elements 15, entraining elements, which are shown in FIGS. 1 and 2, are disposed between the sliding lid 3 and lid liner 7. The entraining elements, provided in this example at the front edge of the lid liner 7 at both sides in a corresponding arrangement, each consist of a downwardly pointing lug 23, fixed to the sliding lid 3 and having a downwardly open slit (which cannot be seen in the drawing) and of an upwardly pointing counter-lug 25, fixed to the lid liner 7 and having a stud bolt 26 provided for seating in the slit. The entraining elements constructed in this manner ensure that, on the one hand, relative displacements between the sliding lid 3 and the lid liner 7 in the displacement directions of the sliding lid 3 are prevented, but that relative movements between sliding lid 3 and lid liner 7 in the vertical direction are possible. The sliding roof construction briefly described above corresponds in its construction and function completely to that shown and described in the abovementioned patent application. If the sliding lid 3, starting from its closed position illustrated in FIGS. 1 and 3, is first lowered by the drive means, not shown, into the position illustrated in FIGS. 2 and 4 in order to initiate its opening displacement, then the two-armed levers 16 pivot about the bearing journals 17, because the bearing pins 18 together with the bearing blocks 19 move downwards with the sliding lid 3. Due to the two-armed system, the guide pins 20 move upwards, pivoting in the guide slits 21 and simultaneously sliding therein. Consequently, the support members 22 and therefore the lid liner 7 firmly fixed to them are displaced out of the fixed liner opening 8 upwards into the position shown in FIGS. 2 and 4. In this movement, the guide shoes 12, 13 also displace outwards, i.e. with an increasing distance between them, on account of the necessary pivot length adjustment at the two-armed levers 16. When the sliding lid 3 has been fully lowered out of its roof opening 2 and the lid liner 7 has been fully displaced upwards, the sliding lid 3 and lid liner 7 are in the parallel position illustrated in FIGS. 2 and 4 and are now displaced, if the drive action on the sliding lid 3 is continued, jointly in this orientation backwards and beneath the fixed roof surface 1 in the direction of the arrow 27 shown in FIG. 2. Entrainment during sliding is provided by the entraining elements, consisting of the lugs 23 and counter-lugs 25, which in the lowering movement of the sliding lid 3 and simultaneous lifting movement of the lid liner 7 come into engagement by the stud bolts 26 and the associated slits in the lugs 23.

If the sliding lid 3 is displaced out of the completely opened position or a partly opened position back into its closed position, i.e. in the direction opposite to arrow 27, then once again the lid liner 7 is positively entrained, until the sliding lid 3 has reached a defined limiting position provided by its drive elements, that coincides with the position of the components shown in FIG. 2. If the closing drive is continued, the sliding lid is now moved upwards, parallel to its illustrated orientation, into the position shown in FIG. 1. Simultaneously the lid liner 7 is moved downwards by means of the guide elements 14 and 15 until finally it again adopts its aligned position with the remaining fixed liner 9.

In the example shown in FIGS. 1 to 4, the lid liner 7 consists of a sheet metal or plastics plate 28, domed or curved if necessary to correspond to the arch of the roof, and is covered on its lower face with a lining fabric 29, which is conducted around its peripheral edge. The fixed liner 9 is constructed as a shell 30 moulded from plastics with a lining fabric 31 covering it on its lower face, which also is conducted around the peripheral edge of the fixed liner opening 8. The plate 28 of the lid liner 7 possesses a peripheral edge 32, extending around all four sides, which is upwardly bent so that an outwardly and upwardly inclined peripheral oblique surface results, which constitutes an outer bearing surface 33 (FIGS. 2, 4). Correspondingly, on the peripheral edge 34 of the fixed liner 9, forming the boundary of the fixed liner opening 8, there is provided an inwardly, downwardly-inclined, oblique surface, which constitutes the counter-surface 35, complementary to the bearing surface 33. As can be seen from FIGS. 1 and 3, the bearing surface 33 and counter-surface 35 bear against each other without a gap in the closed position and can be firmly pressed together by the drive means acting upon the sliding lid 3 and lid liner 7. Slight upward displacements of the lid liner 7 lead to an immediate lifting of the bearing surface 33 off the counter-surface 35, causing an air gap of adjustable width to be produced between these surfaces.

Figure 6:
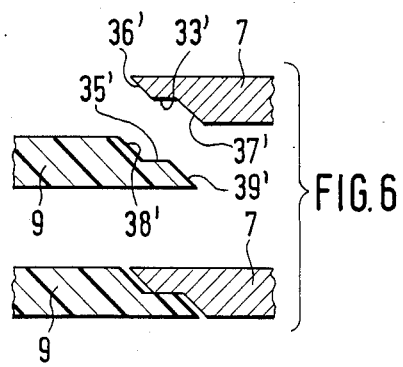
Figure 7:
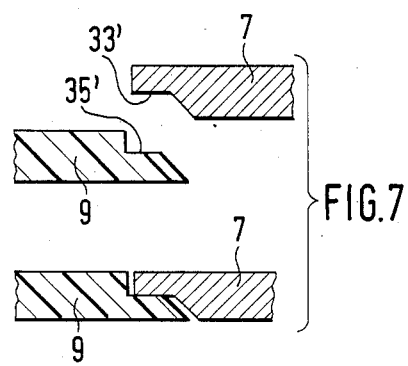

To illustrate further forms of embodiment relating to the peripheral edges of the lid liner and fixed liner opening, reference is now made to FIGS. 5 to 10. In FIGS. 5 to 9, the bearing surface 33' at the peripheral edge of the lid liner 7 is constructed as a stepped surface, that is, it extends generally horizontally. This bearing surface 33', in the examples according to FIGS. 5 to 9, bears from above against a correspondingly orientated counter-surface 35' at the peripheral edge of the fixed liner opening. The counter-surface 35' can be formed directly by the upper surface of the fixed liner 9, as is the case in the examples according to FIGS. 8 and 9, but it may also be constructed as a stepped surface, as is seen in FIGS. 5 to 7. In all of the examples illustrated in FIGS. 5 to 10, the bearing surface 33' and the associated counter-surface 35' constitute only partly the associated peripheral edge of the lid liner 7 and fixed liner opening 8, respectively. In the embodiment shown in FIG. 5, generally vertically orientated surfaces 36 and 37 adjoin the bearing surface 33' on either side. Correspondingly, generally vertically orientated surfaces 38 and 39 also adjoin the counter-surface 35' on each side. In the closed position, the surfaces 36 and 38, on the one hand, and the surfaces 37 and 39, on the other hand, lie opposite each other in pairs to form a gap, as can be seen from the lower half of FIG. 5. This means that the lid liner 7 does not need to be fitted without a gap into the fixed liner opening 8, but nevertheless makes possible, by the arrangement of the bearing surface 33' and counter-surface 35' illustrated, a gap-free closed position. The same is true also for the other examples shown in FIGS. 6 to 10.

Figure 8:
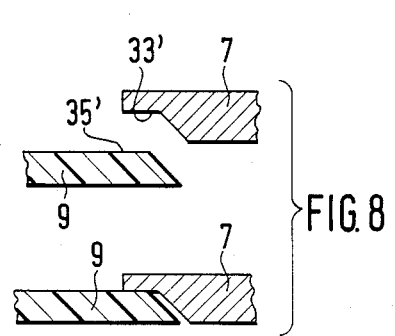
Figure 9:
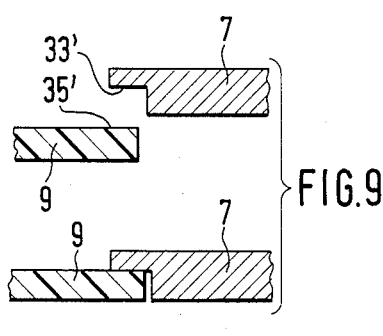
Figure 10:
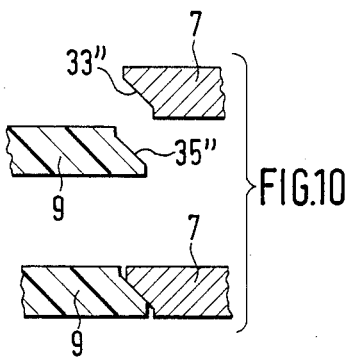

The surfaces laterally adjoining the bearing surface 33' and counter-surface 35' do not need to be orientated vertically in pairs, as has been described with reference to FIG. 5 and as is also the case in FIG. 9 and partly also in FIG. 7, but these surfaces may also be oblique surfaces forming a gap and inclined in pairs, as is illustrated in FIGS. 6 and 8 and partly also in FIG. 7. The form of embodiment according to FIG. 6 differs from that according to FIG. 5 only in that the gap-forming surfaces 36', 38' and 37', 39' opposite each other in pairs are oblique surfaces which agree in the direction of their slopes. The example shown in FIG. 10 represents a variant of the embodiment according to FIGS. 1 to 4. Here, the bearing surface 33" and the counter-surface 35" are also inclined oblique surfaces, but they do not constitute the entire area of the relevant peripheral edge but only its central region. On each side of the bearing surface 33" and also of the counter-surface 35", there adjoin vertical surfaces, not further referenced, which in the closed position form an upper and a lower gap in pairs.

I claim:

1. In a sliding roof for an automobile having a roof, a roof opening, lateral guide rails adjacent said roof opening, a rigid sliding lid which is slidably guided by said guide rails, and a reinforcing frame connected to said roof for framing the roof opening at the front and sides of said roof opening, that improvement comprising:
    a sliding roof frame below said reinforcing frame;
    said guide rails being supported on said sliding roof frame;
    said guide rails having guide channels open towards said roof opening and located at an inner periphery of said sliding roof frame;
    a fixed liner below said sliding roof frame terminating in a vertical cross section having an acute angle formed between a bottom side and an inner linear edge of said fixed liner;
    a connecting strip over an edge of said sliding roof frame and overlying said fixed liner adjacent a flat upper edge of said liner which strip surrounds the edges of said sliding roof frame, said connecting strip extending above said flat upper edge of said fixed liner;
    a substantially rectangular movable lid liner having a peripheral edge which extends around the four sides of said movable lid liner, which edge is upwardly bent at an angle which is complementary to the acute angle of each edge of said fixed liner whereby the peripheral edge of said movable lid liner provides a counter surface for said inner edge of said fixed liner thereby providing substantially parallel surfaces which are adapted to mate in an inclined direction, said respective mating surfaces sealing against each other in a closed position to prevent any separation of the respective mating edges which would allow traveling noises to enter the interior of said vehicle.

2. A sliding roof as claimed in claim 1 including front and rear guide shoes which slidably engage into said guide channel and further including levers pivoted to said sliding lid and said movable liner which are pivotedly mounted on bearing journals on said front and rear guide shoes to articulate said rigid sliding lid upwardly and said movable liner downwardly toward a closing position with said fixed liner.

* * * * *